United States Patent [19]

Han

[11] Patent Number: 5,016,493

[45] Date of Patent: May 21, 1991

[54] VARIABLE SPEED GEARING ASSEMBLY

[76] Inventor: Kyung S. Han, 1922 Coe's Post Run, Westlake, Ohio 44145

[21] Appl. No.: 459,648

[22] Filed: Jan. 2, 1990

[51] Int. Cl.⁵ .............................................. F16H 35/00
[52] U.S. Cl. ........................................ 74/840; 74/86; 74/384; 74/413
[58] Field of Search ................... 74/384, 840, 86, 413

[56] References Cited

U.S. PATENT DOCUMENTS

| | | | |
|---|---|---|---|
| 3,398,596 | 8/1968 | Jahnke | 74/413 |
| 3,943,786 | 3/1976 | Mills | 74/384 |
| 4,151,760 | 5/1979 | Bernasconi et al. | 74/840 |
| 4,261,225 | 4/1981 | Zahradnik | 74/665 GA |

Primary Examiner—Allan D. Herrmann
Assistant Examiner—David W. Laub
Attorney, Agent, or Firm—Harpman & Harpman

[57] ABSTRACT

A mechanical transmission device to provide selective gear speed output from a constant input. A variation gear affixed to an adjustable crank determines output speed of a free floating following gear and connecting rod assembly dependent on the relative orbit size of the variation gear as determined by the crank. The orbit size is adjusted by the angular inclination of the adjustable crank.

5 Claims, 3 Drawing Sheets

VARIABLE SPEED GEARING ASSEMBLY

BACKGROUND OF THE INVENTION

1. Technical Field

This device relates to gear transmissions that can reduce or multiply the output speed from a given power source to provide useful control and output by the variation of relative gear ratios in a variety of applications.

2. Description of Prior Art

Prior Art devices of this type are reflected by any number of gear and non-gear transmissions well known in the prior art and are for the most part fairly complicated such as is found in vehicle use.

Other gear transmitting devices can be seen, for example, in U.S. Pat. Nos. 3,398,596 and 4,261,225.

In U.S. Pat. No. 3,398,596 a gain power transmitting device is disclosed that utilizes a pair of gears controlled within and driven by an internal gear. The pair of gears in turn drive secondary gears engaging a pinion gear and a connected output shaft and pulley.

In U.S. Pat. No. 4,261,225 a step down device for a plurality of extrusion screws is shown wherein the applied torque of a first extrusion screw is split between the main shaft and two satellite shafts which in turn drives a second parallel extrusion screw as used in the plastic resin injection industry.

SUMMARY OF THE INVENTION

A variable speed geared transmission to provide variable speed output by use of a simple and inexpensive multiple gear system that relies on the relative orbit size of a variation gear affixed on a rotating crank shaft. The orbit size is determined by the relative position of the crank. Output rotation is achieved by engagement of a following gear and rod assembly to produce a cycleable output with useable output initially limited to a half cycle.

DESCRIPTION OF THE PREFERRED EMBODIMENT

Figure 1:
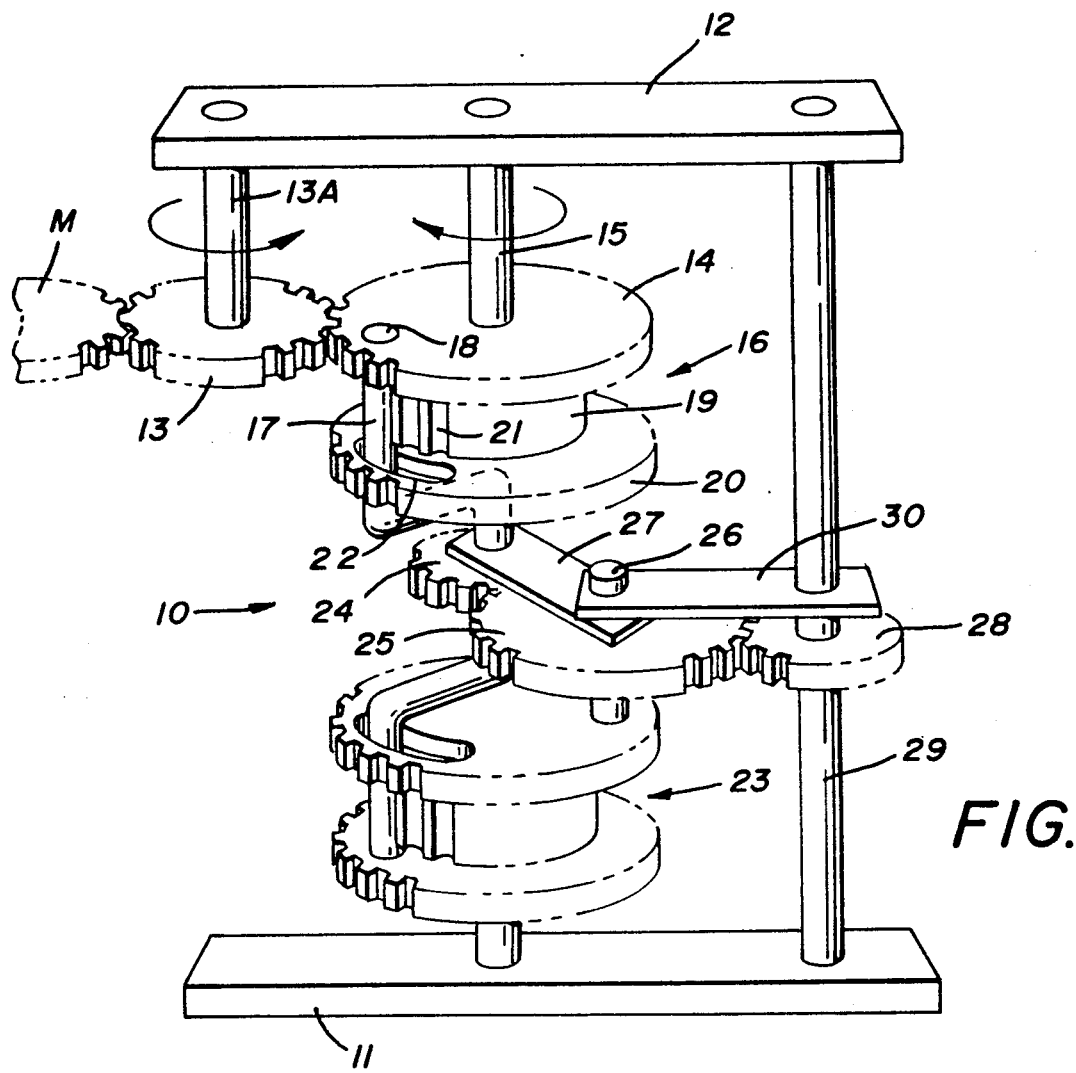
FIG. 1 is a perspective view of the invention in its simplest illustrative form.
Figure 2:
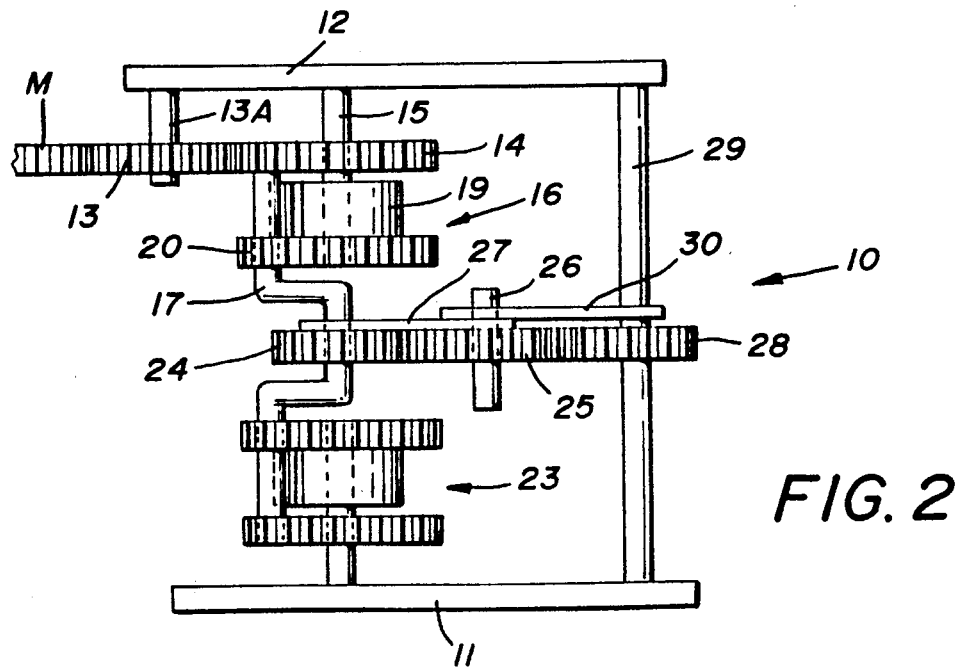
FIG. 2 is a side plan view of the invention of FIG. 1.

Referring to FIGS. 1 and 2 of the drawings, a multiple gear assembly 10 can be seen having a support base bracket 11 and a top support bracket 12. A drive or input gear 13 is positioned on an input shaft 13A coupled with a source of rotatable power comprising drive motor and gear M. The drive gear 13 is meshed with a secondary input gear 14 rotatable on a main shaft 15 supported within the top support bracket 12.

A control gear assembly 16 is rotatably positioned on the main shaft 15 adjacent said secondary input gear 14 and is interconnected to same via a variation control drive crank shaft 17 that is pivotally affixed into the secondary input gear 14 adjacent its perimeter edge at 18. The control gear assembly 16 is comprised of a crank positioning element 19 integral with a control gear 20. The crank positioning element 19 in this example has a series of four crank shaft registration notches 21 that selectively retain and position the crank shaft 17. The control gear 20 is arcuately slotted at 22 through which the crank shaft 17 passes which allows for the relative angular inclination repositioning of the crank shaft 17 as will be discussed in greater detail to follow. A secondary control gear assembly 23 is shown in spaced oppositely disposed relation to said control gear assembly 16 and works in conjunction therewith.

A variation gear 24 is keyed to the crank shaft 17 between said control gear assemblies 16 & 23 and is meshed with a following gear 25 on a free shaft 26. A connecting rod 27 extends from the crank shaft 17 adjacent the variation gear 24 to the free shaft 26 hereinbefore described. An output gear 28 is keyed to an output shaft 29 and meshes with the following gear 25. A secondary connecting rod 30 pivotally interconnects the free shaft 26 and the output shaft 29.

It will be evident that the connecting rods 27 and 30 maintain the following gear 25 in mesh contact with both the variation gear 24 and the output gear 28.

It should be noted that for clarity and understanding the multiple gear assembly 10 is shown at its bare minimum representative elements and that multiple configurations of same with controls for drive input and respective output will be necessary and applicable for use in final configurations required in different environments.

Referring now to FIGS. 3-7 illustrative representations of the mutiple gear assembly can be seen at various output or drive ratios evident.

Figure 5:
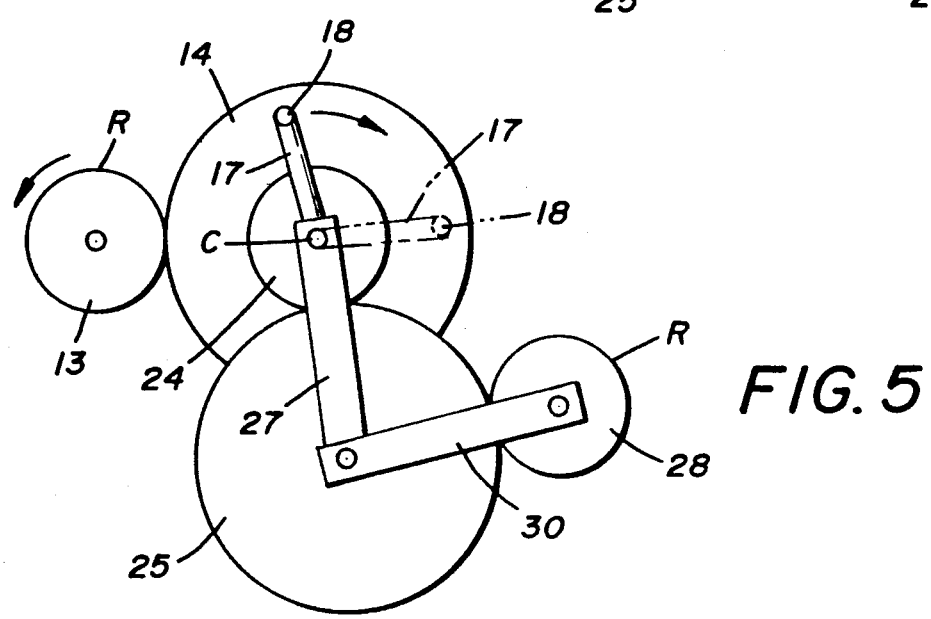
FIG. 5 is a diagramical view illustrative of the minimum ratio output.

In FIG. 5 of the drawings the input or drive gear 13 drives a secondary input gear 14 rotating the end of the crank shaft at 18 as hereinbefore described. Since the center axis C of the variation gear 24 is aligned with the axis of the main shaft 15, the relative rotation of the variation gear 24 by the crank shaft 15 (shown in broken line) drives the following gear 25 and output gear 28 respectively rendering an output ratio of R.

Figure 4:
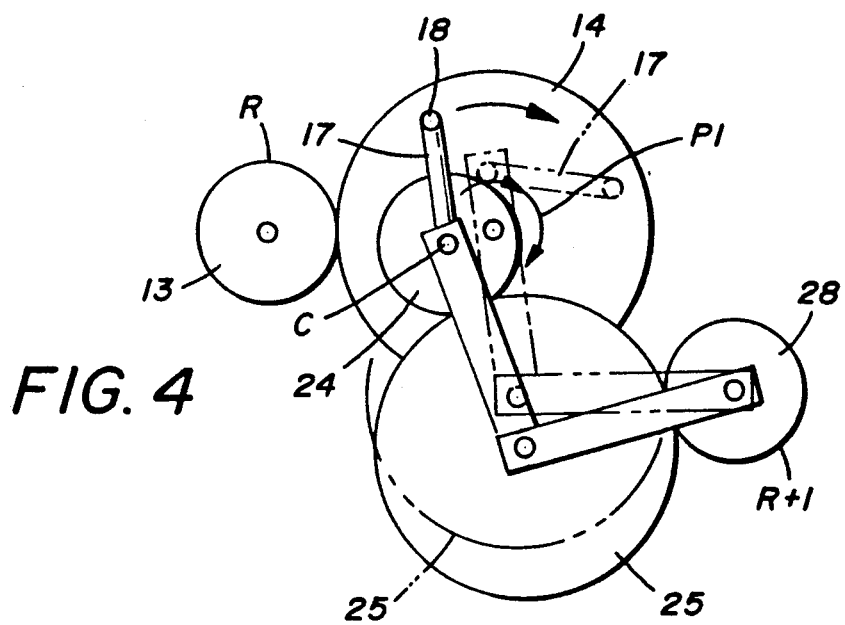
FIG. 4 is a diagramical view illustrative of an intermediate ratio output.

In FIG. 4 of the drawings the center axis C of the variation gear 24 is no longer aligned with the main shaft 15 and thus the center axis C of the variation gear 24 orbits about the main shaft 15 in an orbital path P1 indicated by an arrow.

The crank shaft 17, connecting rods 27 and 30 and center axis C of the variation gear 24 and following gear 25 are also shown in broken lines indicative of the orbital path movement described above. The resulting final drive output ratio R+1 has increased since the larger orbital path P1 of the variation gear 24 effectively acts as a larger rotating gear.

Figure 3:
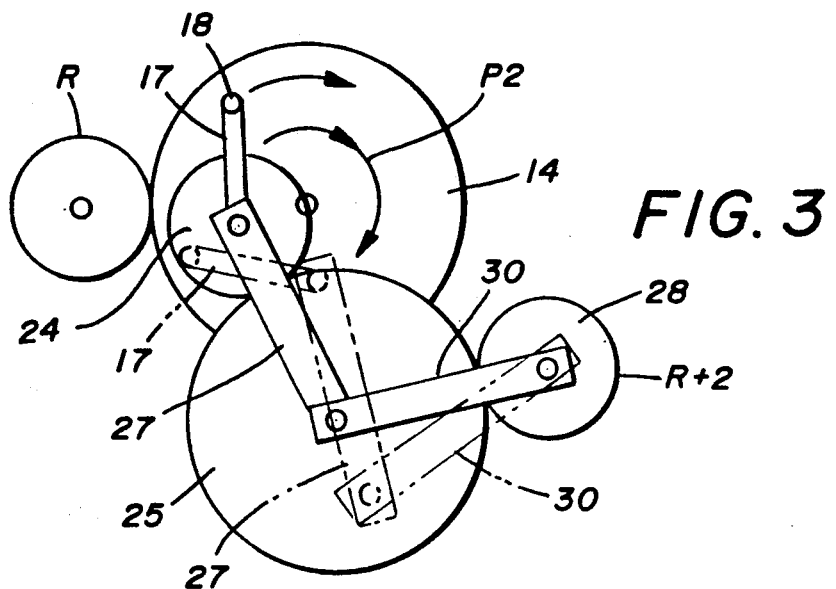
FIG. 3 is a diagramical view illustrative of the maximum ratio output differential.
Figure 6:
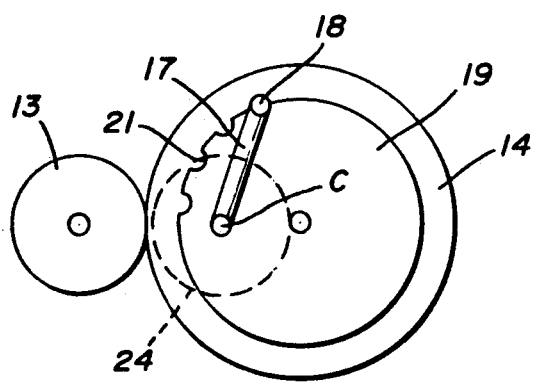
FIG. 6 is a diagramical view of FIG. 3 with a control and positioning gear engaged.

In FIG. 3 of the drawings a maximum orbital path P2 is illustrated. Since the orbital path has been increased, the effective variation gear 24 size is larger thus increasing the output ratio to R+2. Referring now to FIG. 6 of the drawings it will be seen that to change the orbital path P as described it is necessary to change the relative angular inclination of the crank shaft 17. The crank positioning element 19 and control gear 20 are normally driven at the same speed as the secondary input gear 14 by the virtue of the crank shaft 17 extending therethrough.

Figure 8:
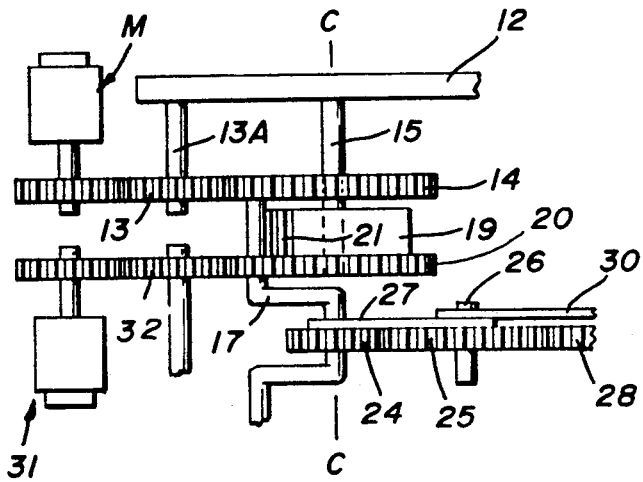
FIG. 8 is a partial side plan view of the invention of FIG. 1 with drive and control inputs at minimum output ratio differential.

In FIG. 8 of the drawings the drive motor and gear assembly M is shown with a secondary control motor gear assembly 31 meshed to an intermediary transfer gear 32 correspondingly meshed to the control gear 20.

In operation, the control gear assembly 16 must match the relative speed of the drive motor and gear assembly M since the secondary drive gear 14 and control gear 20 rotate at the same speed. By varying the speed of the control motor gear assembly 31 momentarily the position of the control gear 20 can be changed relative the secondary drive gear 14 forcing the angular inclination of the crank shaft 15 to change as it is repositioned within the crank shaft registration notches 21. This crank shaft repositioning is made possible by the following gear 25 and associated connecting rods 27 and 30 which act to restrict the limits of the crank shaft's 15 angular inclination to a range that coincides with the registration notches 21 as hereinbefore described.

Figure 9:
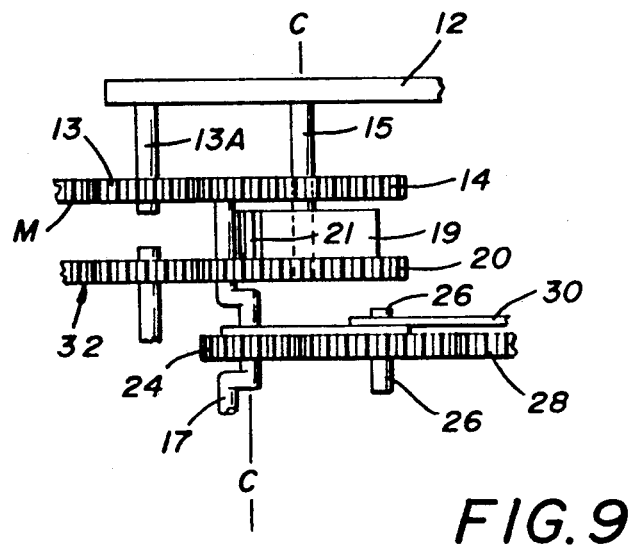
FIG. 9 is a partial side plan view of the invention of FIG. 8 at maximum output ratio differential.

Referring to FIGS. 6 and 9 of the drawings the maximum change in angular inclination of the crank shaft 17 has been achieved. The representative effective orbit P2 of the variation gear 24 shown in dotted lines has moved (increased) as indicated and the crank shaft 17's angular inclination is repositioned and locked by the respective registration notch 21.

Figure 7:
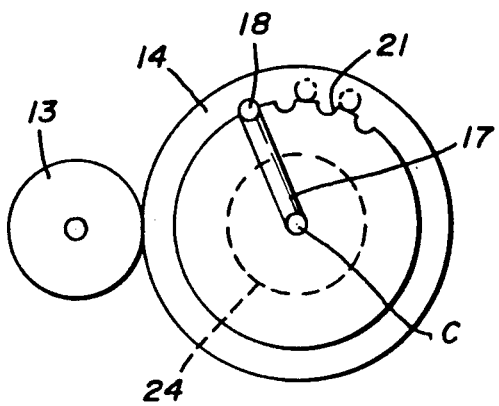
FIG. 7 is a diagramical view of FIG. 5 with a control and positioning gear engaged.

In FIG. 7 of the drawings the actual locking of the repositioned crank shaft 17 is illustrated with the effective intermediary position of the shaft 17 between the notches 21 shown in broken lines. The locking engagement of the crank shaft 17 within the selective notches 21 as hereinbefore described acts to lock the crank shaft 17 to the crank positioning element 19 forcing the variable gear 24 to orbit within the limits defined by the connecting rods 27 and 30 and meshed following gear 25.

It will thus be seen that the multiple gear assembly 10 as illustrated and described above effectively provides a variable transmission dependent on the orbital path of the specific variation gear 24 on the crank 17.

It will also be evident as noted above that the cycleable nature of such an output ratio can be placed in useful range by multiplicity of gear elements effectively enhancing and overcoming the limited cycleable nature inherent within the above described gear assembly. Such variations and additions and multiplicity of gear configurations are well within the scope and understanding of those skilled in the art and it will be obvious thereto that those skilled within the art that various changes and modifications may be made therein without departing from the spirit of the invention.

Therefore I claim:

1. A transmission device for variable speed output from a common source of rotatable power, said transmission device comprising, a output gear on a input shaft driven by said source of rotatable power, a secondary input gear on a main shaft driven by said input gear, a control gear assembly on said main shaft, a variation control drive crank shaft is axially offset and extending from said input gear through said control gear assembly driving same, a variation gear keyed to said crank shaft, a following gear on a free shaft in meshed engagement with said variation gear and an output gear on an output shaft, connecting rods interconnecting said crank shaft adjacent said variation gear, said free shaft and said output shaft, said control gear assembly having a crank positioning element, means for selectively engaging said crank shaft with said crank positioning element, said crank shaft has a angular inclination dependent on said control gear assembly.

2. The combination defined in claim 1 wherein said means for selective engagement of said crank shaft with said crank positioning element comprises a plurality of registration notches on said crank positioning element and arcuately slotted control gear through which said crank shaft extends.

3. The combination defined in claim 1 wherein said crank shaft has a initial angular inclination that aligns with a central axis of said variation gear on said main shaft, and wherein said crank shaft's initial angular inclination position the center axis of said variation gear offset respectively to said initial angular inclination position of said central axis alignment.

4. The combination defined in claim 2 wherein said arcuately slotted control gear selectively engageable on said crank shaft and repositioning same in said registration notches to effect changes in said angular inclination of said crank shaft relative said main shaft alignment.

5. A transmission device for variable speed output from a common source of a rotatable power, said transmission device comprising, a input gear on a input shaft driven by said source of a rotational power, a secondary input gear on a main shaft driven by said input gear, a control gear assembly on said main shaft, a following gear on a free shaft meshed with a variation gear and a output gear, said output gear on an output shaft, said variation gear having a central axis initially aligned with said main shaft, means for changing an orbital path of said variation gear's central axis about said initial alignment with said main shaft, connecting rods interconnecting said variation gear, said following gear and said output gear respectively.

* * * * *